United States Patent [19]

Allam et al.

[11] Patent Number: 5,324,452
[45] Date of Patent: Jun. 28, 1994

[54] INTEGRATED PLATE-FIN HEAT EXCHANGE REFORMATION

[75] Inventors: Rodney J. Allam, Guildford; John D. Bassett, Surrey, all of England; Joseph M. Abrardo, Schnecksville, Pa.; Philip L. Da Prato, Whitehouse, N.J.

[73] Assignee: Air Products and Chemicals, Inc., Allentown, Pa.

[21] Appl. No.: 75,155

[22] Filed: Jun. 10, 1993

Related U.S. Application Data

[63] Continuation of Ser. No. 910,477, Jul. 8, 1992, abandoned.

[51] Int. Cl.⁵ ............................................. C01B 3/32
[52] U.S. Cl. ................................. 252/373; 165/166; 48/198.1; 48/198.2
[58] Field of Search ...................... 252/373; 165/166; 48/198.1, 198.2

[56] References Cited

U.S. PATENT DOCUMENTS 3,971,847 7/1976 Houseman .................... 423/650
3,982,910 9/1976 Houseman et al. ............... 48/61
3,992,168 11/1978 Toyama et al. ................. 62/42
4,071,330 1/1978 Sederquist ...................... 48/94
4,338,107 7/1982 Swallow ........................ 62/17
4,401,155 8/1983 Royal et al. ................... 165/166
4,681,603 7/1987 Spangler et al. ................. 55/27
4,858,685 8/1989 Szues et al. .................... 165/166
4,890,670 1/1990 Schiessi ......................... 165/76
4,999,133 3/1991 Banquy .......................... 252/373
5,035,284 7/1991 Oya et al. ..................... 165/146
5,066,421 11/1991 Giacobbe ...................... 48/198.1

FOREIGN PATENT DOCUMENTS

2066841 7/1981 United Kingdom .

Primary Examiner—Johann Richter
Assistant Examiner—John Peabody
Attorney, Agent, or Firm—Geoffrey L. Chase; James C. Simmons; William F. Marsh

[57] ABSTRACT

The present invention is a reformation process using a compact, plate-fin heat exchanger with multi-stream, multi-passage capability to provide parallel juxtaposed heat exchange of the various process streams of a reformation process.

24 Claims, 5 Drawing Sheets

INTEGRATED PLATE-FIN HEAT EXCHANGE REFORMATION

This is a continuation of application Ser. No. 07/910,477 filed Jul. 8, 1992, abandoned.

TECHNICAL FIELD

The present invention is directed to the field of reformation of a hydrocarbon feed stream into a synthesis gas product. More particularly, the present invention is directed to reforming a hydrocarbon stream to produce a synthesis gas with all major heat exchange functions consolidated in a multi-stream plate-fin heat exchange.

BACKGROUND OF THE INVENTION

The production of hydrogen and carbon monoxide has traditionally been performed by reforming hydrocarbons such as methane in the presence of steam and a catalyst. Reforming of hydrocarbons typically results in a synthesis gas which may contain hydrogen, carbon monoxide, carbon dioxide, steam and methane. Hydrocarbon reforming is an endothermic process which requires significant heat input to affect reaction. Typically in providing sufficient heat to drive the endothermical hydrocarbon reformation reaction, significant heat losses are accommodated by the production of excess steam. In many instances, excess steam is not usable or desired. In addition, an array of heat exchange equipment is necessary to recover all of the high temperature useable heat created to drive the endothermic hydrocarbon reformation reaction. Conventional reformers in general have two separate heat exchange trains which are composed of a series of two-stream discrete heat exchange units. The first train cools the reformer furnace flue gas to a low temperature against reformer steam/hydrocarbon feed, vaporizing and possibly super-heating steam, condensate heating and hydrocarbon heating. This heat exchange is generally carried out in adducted heat exchange unit, in which the heating streams exchange heat with the flue gas in discrete tube banks of plain or finned tubes. The second train cools the high pressure reformed gases from the reformer furnace in a waste heat boiler followed by a series of separate shell and tube, two-fluid heat exchangers against preheating feed gas streams, process condensate, etc. A large part of the cost of a reformer lies in these two heat exchange systems with their associated piping. Attempts have been made to produce simpler, more cost effective heat transfer systems. The reformer can be designed to include convection heat transfer so that the hot reformed gas is used to preheat feed or provide part of the heat for the reforming reaction. Some heat exchange units use a separate hot gas heat exchanger and some have concentric tubes in the reformer furnace with catalyst in the annulus and product gas flowing through the inner tube, thus the reacting gas mixture is heated from the furnace side and from the inside simultaneously. Reformers of this type have lower product gas exit temperatures than conventional reformers, giving reduced size waste heat boilers and are capable of operating efficiently with little or no export steam production. Attempts have been made to provide more effective heat integration in reforming reactions, but such attempts have not succeeded in combining the identified two separate heat exchange trains into a single heat exchange function.

Heat exchangers which used an annular space to heat exchange flue gas and reformate against steam and hydrocarbon to be reformed are typified by U.S. Pat. No. 4,071,330 which shows such an apparatus. This patent does not show additional heat exchange function to preheat feed, cool reformate or extract additional heat from flue gas.

Shell and tube heat exchange function as described above is exemplified by U.S. Pat. Nos. 3,971,847 and 3,982,910. These patents utilize shell and tube heat exchange apparatus to preheat hydrocarbons and air prior to partial oxidation reformation to produce hydrogen rich product. These processes are limited in the number of streams which can be heat exchanged one against the other due to the shell and tube construction wherein one gas stream must occupy the entire shell region while another gas stream occupies the tube region.

U.S. Pat. No. 3,992,168 discloses a plate-type heat exchanger that is used to rectify the components of a mixed gas stream, such as the recovery of hydrogen from a mixture such as "purse" gas in an ammonia synthesis gas, off-gas purification of petroleum or coke oven gas. Such a rectifying plate heat exchanger operates in the context of a dephlegmator.

Other plate type heat exchangers and plate-fin type heat exchangers are disclosed generically in U.S. Pat. Nos. 4,858,685; 4,890,670 and 5,035,284. These plate type heat exchangers are not identified for any particular service or process duty.

U K. Patent Application GP2066841 discloses a saturation system for saturating a reformer feed with water prior to heating the saturated reformer feed in the flue gas of a traditional reformer which reforms the reforming feed as a feed gas to a methanol reactor.

U.S. Pat. No. 4,681,603 discloses a process for direct injection of water into a reformer feed in a coil-wound heat exchanger heated by reformer flue gas or shift reactor effluent. The saturated reformer feed is then passed through a separator to remove excess condensate and sent to a reformer to reform the feed to appropriate product slate.

The present invention overcomes the drawbacks of the prior art of using a plurality of separate heat exchangers and, with regard to some prior art, of the production of excess steam for energy efficiency, by the utilization of a unique multistream compact heat exchange function, as will be more clearly described below.

BRIEF SUMMARY OF THE INVENTION

The present invention is a process for reforming a hydrocarbon stream into a synthesis gas product by heating the hydrocarbon stream against process streams at an elevated temperature comprising the steps of introducing the hydrocarbon stream into a plate-fin heat exchanger and heating the hydrocarbon stream to an elevated temperature by juxtaposed parallel heat exchange against the process stream; reforming the hydrocarbon stream at elevated temperature to produce a synthesis gas product; and cooling the synthesis gas product towards ambient temperature by passing the product through the plate-fin heat exchanger and heating the hydrocarbon stream and/or process streams by juxtaposed parallel heat exchange.

Preferably, steam is mixed with the hydrocarbon stream by separately heating the stream and water in the plate-fin heat exchanger in juxtaposed parallel heat exchange against process streams, removing the stream and water from the heat exchanger and directly contacting them in a separate saturator zone to saturate the stream with steam.

Alternatively, steam is mixed with the hydrocarbon stream by direct injection of water into the stream and subsequent passage of the resulting stream and water mixture through the plate-fin heat exchanger to heat the mixture by juxtaposed parallel heat exchange against process streams to form a hydrocarbon and steam stream for reforming to a synthesis gas product.

Preferably, the hydrocarbon stream is initially heated in the plate-fin heat exchanger, is subsequently introduced directly into a desulfurization zone from said heat exchanger and is desulfurized before further heating in the heat exchanger prior to reformation into the synthesis gas product.

Preferably, water and/or steam is added to said hydrocarbon stream in a saturation zone or by direct injection subsequent to desulfurization and prior to reformation.

Preferably, the reforming step is selected from the group consisting of steam-hydrocarbon reformation, partially oxidation, auto-thermal reformation, dry carbon dioxide reforming and combinations of these processes.

Preferably, the synthesis gas product is introduced directly into a water-gas shift reaction zone from said exchanger to convert carbon monoxide and water in the synthesis gas product to hydrogen and carbon dioxide and a product of the shift reaction zone is cooled by heating the hydrocarbon stream in the plate-fin heat exchanger by juxtaposed parallel heat exchange.

Preferably the reforming is heated by the combustion of fuel and a resulting flue gas is cooled by heating at least the hydrocarbon stream in the plate-fin heat exchanger by juxtaposed parallel heat exchange.

More specifically, the present invention is a process for reforming a hydrocarbon stream and water into a synthesis gas product by heating said hydrocarbon stream and water against a synthesis gas product and a flue gas at an elevated temperature comprising the steps of: introducing the hydrocarbon stream into a plate-fin heat exchanger and heating the hydrocarbon stream to an elevated temperature by juxtaposed parallel heat exchange against the synthesis gas product and flue gas; introducing the water into a plate-fin heat exchanger and heating the water to an elevated temperature by juxtaposed parallel heat exchange against the synthesis gas product and flue gas; mixing the water with the hydrocarbon stream by contacting them in a separate saturator zone to saturate the stream with water; further heating the resulting hydrocarbon and water stream in the plate-fin heat exchanger to an elevated temperature by juxtaposed parallel heat exchange against the synthesis gas product and flue gas; reforming the hydrocarbon and water stream at elevated temperature to produce a synthesis gas product by heating the stream by the combustion of fuel to produce a flue gas; and cooling the synthesis gas product and the flue gas toward ambient temperature by passing the product and the gas separately through the plate-fin heat exchanger and heating the hydrocarbon stream and water to an elevated temperature by juxtaposed parallel heat exchange.

More specifically, the present invention is a process for catalytic reforming a hydrocarbon stream and water into a synthesis product by heating the hydrocarbon stream and water against a synthesis gas product and a flue gas at an elevated temperature comprising the steps of: introducing the hydrocarbon stream into a plate-fin heat exchanger and heating the hydrocarbon stream to an elevated temperature by juxtaposed parallel heat exchange against the synthesis gas product and flue gas; separately introducing the water into the plate-fin heat exchanger and heating the water to an elevated temperature by juxtaposed parallel heat exchange against the synthesis gas product and flue gas; directly introducing the hydrocarbon stream from said plate-fin heat exchanger into a desulfurization zone and desulfurizing the hydrocarbon stream; mixing the water with the hydrocarbon stream by contacting them in the separate saturator zone to saturate the stream with water; further heating the resulting hydrocarbon and water stream in the plate-fin heat exchanger to an elevated temperature by juxtaposed parallel heat exchange against the synthesis gas product and flue gas; catalytically reforming the hydrocarbon and water stream at elevated temperature to produce a synthesis gas product by heating the stream by the combustion of fuel to produce a flue gas; cooling the synthesis gas product and the flue gas toward an ambient temperature by passing the product and the flue gas separately counter-currently to the flow of the hydrocarbon stream through the plate-fin heat exchanger and heating the hydrocarbon stream and water to an elevated temperature by juxtaposed parallel heat exchange; and directly introducing the synthesis gas product from said plate-fin heat exchanger into a water gas shift reaction zone to convert carbon monoxide and water in the synthesis gas product to hydrogen and carbon dioxide and the resulting product of the shift reaction zone is cooled toward ambient temperature by heating the hydrocarbon stream and water to an elevated temperature in the plate-fin heat exchanger by juxtaposed parallel heat exchange.

Preferably, the reforming is a catalytic steam-methane reformation.

Preferably, the desulfurizing is conducted with a catalyst of zinc oxide.

Preferably, the steam necessary for the reforming is produced in the process.

Preferably, the synthesis gas product is separated into a hydrogen stream and a waste stream in the pressure swing adsorption separation.

Preferably, the plate-fin heat exchanger has multiple parallel heat exchange passageways juxtaposed to one another through which the hydrocarbon stream, the water, the synthesis gas product and the flue gas separately pass during heat exchange, one with another.

Preferably, each of the hydrocarbon stream, the water, the synthesis gas product and the flue gas pass separately through a plurality of passageways in the plate-fin heat exchanger.

Alternatively, the present invention is a process for reforming a hydrocarbon stream and water into a synthesis gas product by heating said hydrocarbon stream and water against a synthesis gas product and a flue gas at an elevated temperature, comprising: directly injecting water into said hydrocarbon stream to form a resulting hydrocarbon stream and water mixture; introducing said hydrocarbon stream and water into a plate-fin heat exchanger and heating said mixture to an elevated temperature by juxtaposed parallel heat exchange against said synthesis gas product and flue gas to form a hydrocarbon and steam stream; reforming said hydrocarbon and steam stream at elevated temperature to produce a synthesis gas product by heating said stream by the combustion of fuel to produce a flue gas; and cooling said synthesis gas product and said flue gas toward ambient temperature by passing said product and said gas separately through said plate-fin heat exchanger while heating said hydrocarbon stream and water mixture to an elevated temperature by juxtaposed parallel heat exchange.

Preferably, the water and hydrocarbon streams are separately heated in the plate-fin heat exchanger prior to directly injecting the water into the hydrocarbon stream.

Preferably, the water and hydrocarbon streams are directly mixed in the plate-fin heat exchanger.

Alternatively, the present invention is a process for reforming a hydrocarbon stream into a synthesis gas product by heating said hydrocarbon stream against a synthesis gas product at an elevated temperature and by partial oxidation of said hydrocarbon stream, comprising; introducing said hydrocarbon stream into a plate-fin heat exchanger and heating said hydrocarbon stream to an elevated temperature by juxtaposed parallel heat exchange against said synthesis gas product; introducing an oxidant and optionally additional feed components into a plate-fin heat exchanger and heating said oxidant and optionally additional feed components to an elevated temperature by juxtaposed parallel heat exchange against said synthesis gas product; mixing said oxidant and optionally additional feed components with said hydrocarbon stream; reforming said hydrocarbon stream by at least partial oxidation of said hydrocarbon stream to produce a synthesis gas product and cooling said synthesis gas product toward ambient temperature by passing said product separately through said plate-fin heat exchanger and heating said hydrocarbon stream, oxidant and optionally additional feed components to an elevated temperature by juxtaposed parallel heat exchange.

Preferably, the the reformation is an autothermal reformation having an initial partial oxidation of said hydrocarbon stream followed by the catalytic reformation of any remaining hydrocarbon.

Preferably, the additional feed components are selected from the group consisting of water, steam, carbon dioxide and mixtures thereof.

Preferably, the oxidant is selected from the group consisting of air, oxygen enriched air and oxygen.

Preferably, the hydrocarbon stream is initially heated in the plate-fin heat exchanger, is subsequently directly introduced into a desulfurization zone from the heat exchanger and is desulfurized before further heating in the heat exchanger prior to reformation into the synthesis gas product.

Preferably, the synthesis gas product is introduced directly into a water gas shift reaction zone from the exchanger to convert carbon monoxide and water in the synthesis gas product to hydrogen and carbon dioxide and a product of the shift reaction zone is cooled by heating the hydrocarbon stream in the plate-fin heat exchanger by juxtaposed parallel heat exchange.

DETAILED DESCRIPTION OF THE INVENTION

The present invention is directed to the production of synthesis gas in more efficient and less capital intensive technique than the prior art. Synthesis gas for the purposes of the present invention may include hydrogen containing stream, such as hydrogen-rich products, combinations of hydrogen and carbon monoxide, product streams predominately or rich in carbon monoxide and hydrogen or carbon monoxide stream containing carbon dioxide and residual amounts of other gases such as nitrogen and water.

The more efficient and less capital intensive reformation processes of the present invention entail eliminating two separate trains of heat exchange for the convection section wherein heat energy is removed from flue gas resulting from the combustion of fuel to heat the endothermic reformation reaction and the product gas section wherein synthesis gas product or reformate is cooled to recover heat energy after the elevated temperature reformation by heat exchange with boiler feed water to produce steam, both for export and use in the feed gas to the reformer. Both the convection section and the product cooling section of traditional reforming processes are consolidated and therefore eliminated by combination of heat exchange duty in a compact multistream (three or more streams), multi-passage plate-fin heat exchanger which allows for juxtaposed parallel heat exchange of process streams; such as water, steam, flue gas, fuel, reform feed and synthesis gas product to effect a desirable energy balance with efficient utilization of energy.

The efficient heat integration of the present invention using compact multi-stream, multi-passage plate-fin heat exchangers with parallel juxtaposed heat exchange is particularly attractive when using convective reforming technology wherein the heat of reformed product is in part used to heat hydrocarbon or reforming feed gas to the reformer, resulting in a lower reformate or synthesis gas outlet temperature to be heat exchanged with other process streams, whereby the extent of heat exchange and heat surface area can be diminished and fully accommodated with the compact plate-fin heat exchanger of the present invention.

Preferably, using the compact multi-stream, multi-passage plate-fin heat exchanger of the present invention, all feed and effluent process streams for the reformation reaction can be heat exchanged in such a heat exchanger without duplication of heat exchange equipment.

One of the advantages of the use of a multi-stream, multi passage plate-fin heat exchanger in the reformation process of the present invention is that process streams can be readily removed directly, and without any intervening processing, from the exchanger core through an appropriate manifold at substantially the exact temperature desired for affiliated sub-processes which are associated with the reformation, such as desulfurization of feed, water saturation, and shift of product. In contrast, the prior art typically requires additional heat exchange equipment to adjust the process stream to the appropriate condition for the sub-process or the subprocess is conducted at less than optimal conditions.

The multi-stream, multi-passage plate-fin heat exchanger utilized in the present invention would typically be constructed of materials of construction suitable for elevated temperature, high pressure fluids as are used in a reforming process. Typical materials could be selected from stainless steel or high nickel alloys. Such heat exchangers are manufactured as brazed, welded, or diffusion bonded systems. These plate-fin heat exchangers for the purpose of the present invention can include any form of mechanically assembled plates, whether fins or flow altering features are provided in conjunction with plates or not. However, such plate-fin heat exchanger would include multi-stream, multi-passage configuration to allow juxtaposed parallel heat exchange of diverse process streams, such as syngas, flue gas, reforming feed, water, steam and the like. Such plate-fin heat exchangers can be manifolded to allow two, preferably three or more process streams to heat exchange. In the case of a reforming reaction, preferably at least four or six process streams can be contemplated for heat exchange. The plate fin heat exchanger can be made and utilized in one or more blocks or separate units depending on the size necessary and the limitations of manufacturing. These blocks can be used in parallel or series process flow stream arrangements. When the term is used herein, a plate fin heat exchanger is deemed to include one or more such blocks in parallel or series.

The elevated temperature operation of the plate-fin heat exchanger of the present invention is in contrast to the heat exchange of cryogenic processes, in that the heat exchange of the present invention is between ambient temperature conditions and some elevated temperature or series of incrementally more elevated temperatures above ambient temperature. Whereas, cryogenic processes operate between ambient and some temperature below ambient temperature.

Although in some forms of reformation reaction which can be contemplated for the present invention, water or steam is not necessary such as in dry carbon dioxide reforming or partial oxidation of hydrocarbon with $O_2$ or air, traditionally in most forms of reforming reaction such as steam-methane reforming, water is heated to produce steam and is blended with the methane feed to provide the necessary reactants to produce hydrogen, carbon monoxide, carbon dioxide and water. Traditionally, a large series of heat exchangers were necessary to bring boiler feed water to sufficient high temperature steam conditions to be blended with the methane feed to the reformation reaction. In the present invention, if steam is desired for the particular reforming reaction, water can be directly introduced into the hydrocarbon feed to the reformer just prior to introduction into the plate-fin heat exchanger where heating in situ and steam formation or dry boiling can occur or more preferably, the water and hydrocarbon feed to the reformation reaction are separately heated in the plate-fin heat exchanger and then mixed in a saturator column where the hydrocarbon and water are intimately mixed before the mixture is passed as a steam saturated hydrocarbon feed through the heat exchanger, prior to going to the reformer for reaction. These two techniques for introducing water and/or steam into the hydrocarbon feed to the reformation reaction of the present invention are set forth in the several illustrated embodiments described below.

In the case of dry carbon dioxide reforming or autothermal reforming, additional feed components can be contemplated which would not be used in partial oxidation, including carbon dioxide, and water. In both partial oxidation and autothermal reforming, the oxidant can be air, oxygen enriched air or high purity oxygen such as 99.5% oxygen.

Figure 1:
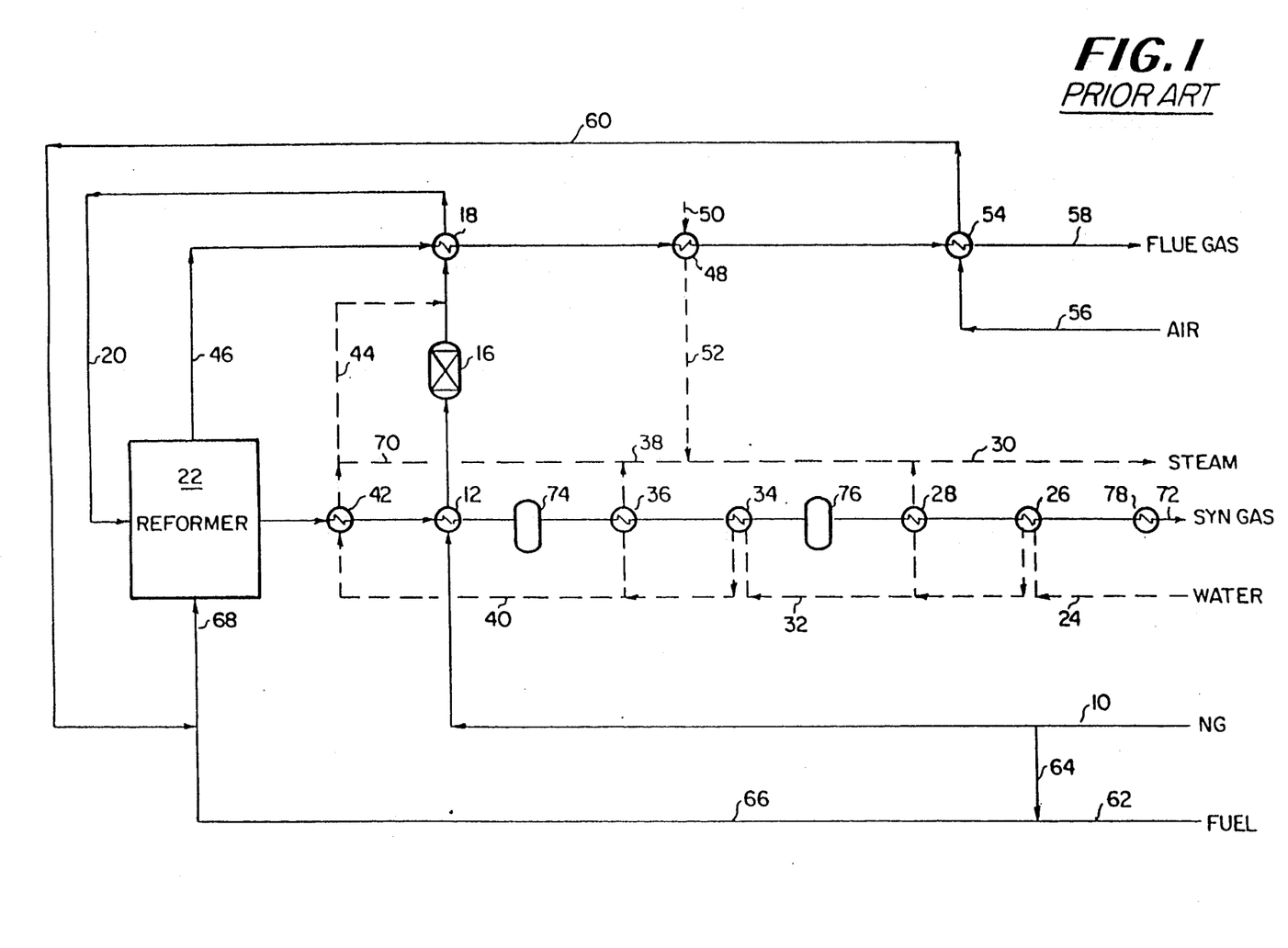
FIG. 1 is schematic illustration of a reformation process of the prior art with two separate trains of multiple heat exchange pathways.

In order to appreciate the advantage of the present invention over the traditional techniques, the prior art reforming process will be briefly described. With reference to FIG. 1, the prior art typically reforms natural gas such as in line 10 by passage through a heat exchanger 12 to warm against reformed product before being desulfurized in a desulfurizing tower or zone 16. Reaction steam is then added, and the mixed feed is further warmed against flue gas in heat exchanger 18 prior to introduction in line 20 into a reformer 22 of any particular style or function. Simultaneously, water in line 24 would be heated to elevated temperature and steam condition in a series of separate discrete heat exchangers 26, 34 and 42 prior to introduction in line 44 into the natural gas stream emanating from desulfurization zone 16. This water stream 24 is heated against reformed product in line 72. In order for the process to be efficient, a portion of the warming water must be removed as export steam. For instance, a portion of the water in line 24 is removed and passed through heat exchanger 28 to be removed as export steam in line 30. The residual water in line 32 is then further subject to use for export steam wherein a separate stream passing through heat exchanger 36 is removed as export steam in line 38. The remaining water stream in line 40 is then utilized for the traditional methane reforming reaction.

In order to drive the prior art reforming process, fuel in line 62 which may include a slip stream in line 64 from the natural gas feed is sent in line 66 to the reformer 22. This is combined with air in line 56 which is warmed in heat exchanger 54 to produce a hot oxidant gas in line 60 which is combined with the fuel in line 66 to produce a combustion fuel in line 68, which is symbolically the equivalent to the reformer burner. Although various forms of reformation have been done in the prior art, traditionally the air and fuel are combusted to heat the natural gas in the presence of catalyst to reform it to a synthesis gas type product. The flue gas at elevated temperature has valuable heat energy and is removed in line 46 from the reformer 22 and subject to a series of heat exchanges in heat exchanger 18 against mixed feed, boiler feed water in line 50 passing through heat exchanger 48 and constituting steam in line 52 as well as heating the combustion air 56 in heat exchanger 54 prior to removing the relatively cooler flue gas as a waste in line 58.

The product of traditional prior art reformation constitutes a hydrogen or carbon monoxide-rich gas which is at elevated temperature and requires cooling in order to make a heat energy efficient process. Such a hydrogen reformate product in line 72 passes through a series of heat exchangers 42, 12, 36, 34, 28, 26 and 78 prior to being removed as a product. Additional hydrogen can be made by passing the reformate in line 72 through a high temperature shift reactor 74 and low temperature shift reactor 76 to convert carbon monoxide in the presence of water and catalyst to additional hydrogen and carbon dioxide.

As can be seen, the traditional prior art reforming process is capital intensive in requiring a number of typically series connected heat exchangers to provide sufficient heat integration to render a heat energy efficient process. These heat exchangers are typically arrayed in a series arrangement to utilize the heat recoverable in the reformate product such as heat exchangers 42, 12, 36, 34, 28, 26, and 78, as well as in a separate train of heat exchangers in series arrangement to recover the heat energy from the flue gas of the reformation reaction exemplified by heat exchangers 18, 48 and 54.

The compact multi-stream, multi-passage plate-fin heat exchangers of the present invention using parallel juxtaposed heat exchange overcomes the capital intensive drawbacks of the prior art in a single integrated heat exchange process. The improvements and efficiencies of the present invention will now be set forth in detail with regard to several preferred embodiments which will readily contrast with the described prior art and demonstrate the surprising and beneficial effect of the present invention.

Figure 2:
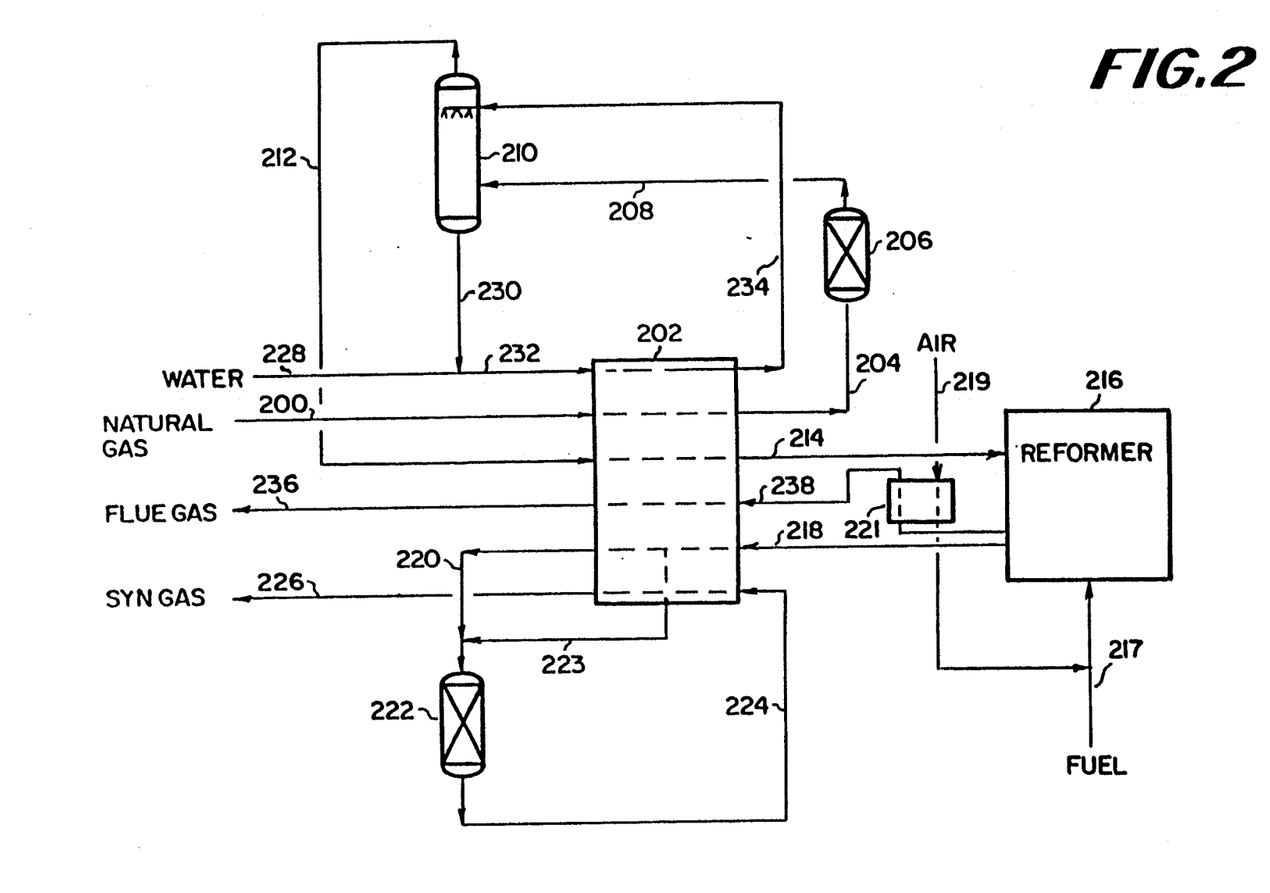
FIG. 2 is a schematic illustration of a first embodiment of the present invention.

With reference to FIG. 2, a first preferred embodiment to the present invention will be set forth. This embodiment of the present invention constitutes a reformation process using a compact multi-stream, multi-passage plate-fin heat exchanger in which process streams including water, natural gas, mixed feed, flue gas, synthesis gas, shift product, air and steam may be heat exchanged one with another in parallel juxtaposed heat exchange to provide efficient heat energy integration of the overall process. Natural gas in line 200 is initially heated to an elevated temperature in the multi-stream, multi-passage plate-fin heat exchanger 202 and exits a first pass of such heat exchanger in line 204 at an elevated temperature. The natural gas is then desulfurized over a catalytic zinc oxide bed in a desulfurizing zone 206. The desulfurized and elevated temperature natural gas now in line 208 is next saturated with steam in gas saturator 210 which constitutes a tower in which the natural gas countercurrently contacts a spray of steam and/or water to result in a saturated steam and natural gas stream in line 212.

This saturated natural gas stream in line 212 passes through the compact plate-fin heat exchanger 202 to reach reformer temperatures or a temperature relatively close to reformer temperatures in the event additional heat energy is obtained from combustion of fuel for reforming duty. The further warmed steam saturated natural gas in line 214 is then introduced into a reformer 216 which may comprise one of any number of state of the art reforming techniques including steam-hydrocarbon reforming, partial oxidation reforming, autothermal reforming, convective reforming, reforming with prereforming stages or combinations thereof. The steam and natural gas are reformed to produce various combinations of hydrogen, carbon monoxide, carbon dioxide, water, methane and potentially nitrogen. The primary components are hydrogen and/or carbon monoxide. These reformed components constitute a synthesis gas which is removed at elevated temperatures from the reformer 216 in line 218. This synthesis gas in line 218 is cooled against other process streams in the compact plate-fin heat exchanger 202 to recover the heat energy from the synthesis gas. A temperature balancing stream 223 can be removed from stream 218 as it passes through the midpoint of exchanger 202 and rejoined with stream 220 before shift.

The synthesis gas at a cooler temperature in line 220 is then optionally subject to a shift reaction in shift reactor 222 to further shift any existing carbon monoxide in the presence of water and shift catalyst to additional hydrogen and carbon dioxide. The further shifted synthesis gas in line 224 is then further cooled in the compact plate-fin heat exchanger against process streams in parallel juxtaposed heat exchange before leaving as a relatively cool synthesis gas product in line 226.

The water utilized in the exemplified steam methane reformation is introduced in line 228 and combined with recycled water in line 230 to constitute a combined water stream in line 232 which is heated to elevated temperature and/or steam conditions in plate-fin heat exchanger 202 by parallel juxtaposed heat exchange against process streams in the heat exchanger before leaving such heat exchanger in line 234 and being introduced into the gas saturator vessel 210 in a spray of water and/or steam in which the water descends and countercurrently contacts the natural gas rising from line 208 in vessel 210. That water, which does not saturate the natural gas and leave via line 212, is recycled in line 230. In steam-methane reforming, such as is exemplified in the preferred embodiment illustrated in FIG. 2 of the present invention, a fuel gas 217 is combusted with an oxidant gas 219, optionally preheated in exchanger 221 against flue gas in line 238, to produce the necessary heat for the endothermic steam-methane reformation in reformer 216. This is performed in a burner connected to the reformer where the fuel and oxidant are actually blended, although this is not illustrated in that detail in the drawing. The resulting flue gas from the combustion of fuel and an oxidant gas in reformer 216 results in a high heat energy value flue gas in line 238 which must be cooled efficiently to recover the heat energy in compact plate-fin heat exchanger 202 by parallel juxtaposed heat exchange with the other process streams of the process. This results in a cool flue gas 236 which is removed from the process.

As can be seen from a description of this first preferred embodiment of the process of the present invention, export steam is not required in order to affect an efficient heat energy balance. In addition, all of the necessary major heat exchange functions of the reforming process are affected in the single heat exchanger 202 comprising a compact plate-fin heat exchanger having multi-stream, multi-passage capability for parallel juxtaposed heat exchange of the various process streams of the process. This is in contrast to the prior art which requires a plurality of series heat exchangers and a complex steam system in order to provide an energy balanced process. The process of the present invention as set forth in the preferred embodiment of FIG. 2 results in a much less capital intensive process. When compared with the prior art on a common capital cost basis, the present invention results in decided energy efficiencies due to the better function on a dollar-for-dollar basis in the heat exchange capability of the present invention in contrast to the prior art.

This first preferred embodiment of the present invention set forth in FIG. 2 takes advantage of an external steam saturator to provide the steam natural gas mixture for the reforming reaction.

Figure 3:
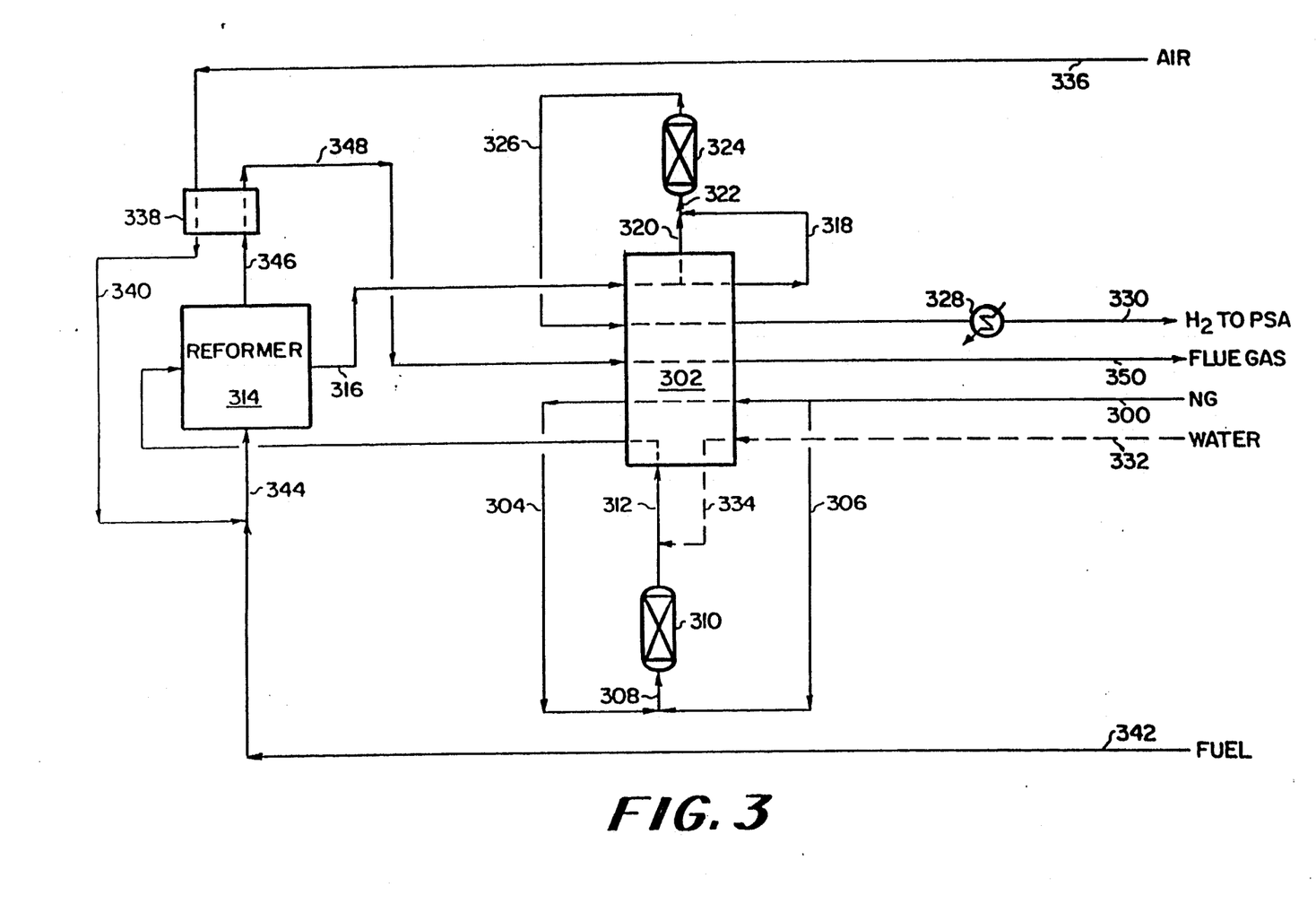
FIG. 3 is a schematic illustration of a second embodiment of the present invention.

This second preferred embodiment of the present invention illustrates the direct water injection identified above and is illustrated with reference to FIG. 3. Natural gas in line 300 is introduced into a compact plate-fin heat exchanger having multi-stream, multi-passage capability for parallel juxtaposed heat exchange with other process streams of the reformation process. The natural gas leaves heat exchanger 302 in line 304 at elevated temperature. It is combined with a slip stream of the natural gas in line 306 which does not pass through the heat exchanger 302. The combination of streams in line 308 is then passed through a desulfurizer vessel 310 packed with a desulfurizing agent such as zinc oxide. The desulfurized natural gas is then contacted with water and/or steam in line 334 which has been heated from the water in line 332 by partial passage through the compact plate-fin heat exchanger 302. Direct water injection into the hydrocarbon stream can occur either in the line 312 leading to the heat exchanger or in a water injection system fitted to the hydrocarbon inlet header (illustrated in FIGS. 4 and 5), or in a water injection system fitted to each of the hydrocarbon heat transfer passages, such as perforated injection tubes. The mixture of natural gas and steam (and potentially water) in line 312 is then further heated in compact plate-fin heat exchanger 302 prior to being introduced into the reformer 314 to be reformed with additional heat from the combustion of fuel and an oxidant gas such as air into a synthesis gas product comprising hydrogen, carbon monoxide, carbon dioxide, water and potentially nitrogen. Although the embodiment contemplates a steam methane reaction driven by an externally fired fuel, it is also contemplated for the present process to utilize forms of reformation, such as steam-hydrocarbon reforming, partial oxidation reforming, autothermal reforming, convective reforming, reforming with prereforming stages or combinations thereof.

The resulting synthesis gas comprising predominantly hydrogen and/or carbon monoxide is removed in line 316 as an elevated temperature product gas and is passed through the compact plate-fin heat exchanger 302 to provide heat to other process streams by parallel juxtaposed heat exchange wherein a portion of the synthesis gas is removed in line 320 after partial passage through the heat exchanger 302 while the remainder of the synthesis gas in line 318 fully passes through the compact plate-fin heat exchanger 302 before being mixed together in line 322 and subject optionally to a shift reaction in shift reaction vessel 324 to convert potentially existing carbon monoxide to additional hydrogen product in the presence of water over an appropriate shift catalyst as well known in the art. This obviously would be used in those instances where additional hydrogen product is desired and would not be used where additional carbon monoxide product is desired.

The shifted synthesis gas is removed in line 326 and gives up additional heat by parallel juxtaposed heat exchanging compact plate-fin heat exchanger 302 to additional or other process streams prior to removal and further cooling in heat exchanger 328 against boiler feed water or air to result in a synthesis gas product in line 330.

This preferred embodiment is illustrated with reference to a steam-methane reaction that is driven by external fuel fired combustion in the reformer 314. This combustion is effected by provision of a fuel stream in line 342 and an oxidant stream such as air in line 336. The air is heated in a recuperator 338 against flue gas before being introduced as an elevated temperature stream in line 340 with the fuel stream in line 342 into line 344 which is symbolically the equivalent of the reformer burner where it is then introduced into the reformer to be combusted and heat by indirect heat exchange the steam methane mixture for reformation. This can be done in any one of a number of traditional reforming techniques which are oxidative, catalytic, or combinations thereof. In addition, convective heat exchange and reformation is contemplated as one of the options in the reformer 314.

The resulting flue gas from combustion of an oxidant and fuel in the reformer 314 results in a hot flue gas in line 346 which heats the incoming air in recuperator heat exchanger 338. The still hot flue gas in line 348 then provides additional heat duty to other process streams by parallel juxtaposed heat exchange in compact multi-stream, multi-passage plate-fin heat exchanger 302 prior to being removed as a cooled flue gas stream for vent in line 350. As can be seen with the previously described preferred embodiment of FIG. 2, the preferred embodiment described with relationship to FIG. 3 provides a reduction in the number of heat exchangers and the arrangement of series heat exchange in deference to the single compact plate-fin heat exchanger of the present invention using parallel heat exchange on a juxtaposed multi-stream, multi-passage basis. This results in a less capital intensive reformation process or in context of set capital cost, the preferred embodiment of FIG. 3 results in a significant advantage on a heat energy balance or efficiency of operation.

Figure 4:
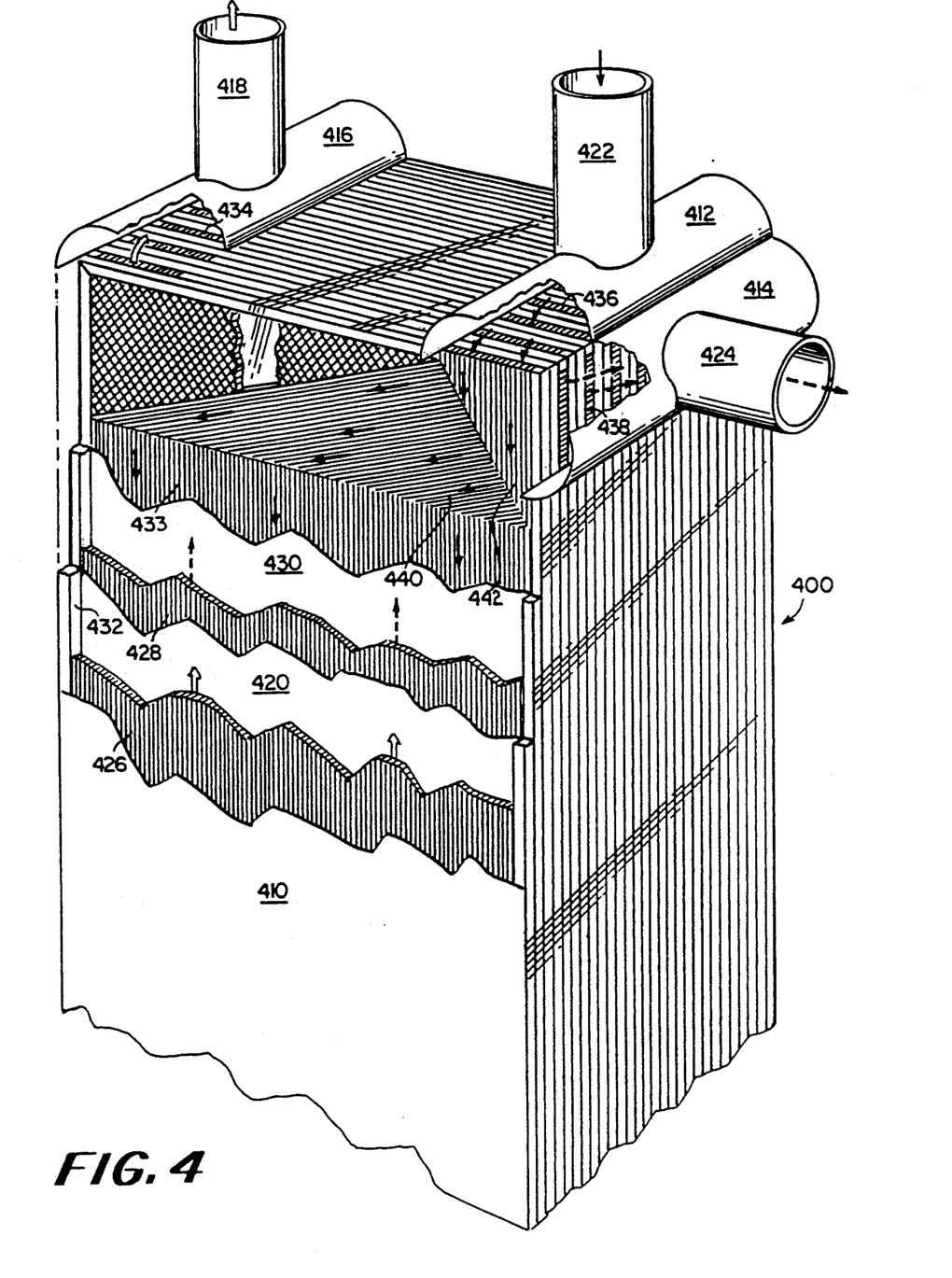
FIG. 4 is a perspective view in partial section of a compact plate-fin heat exchanger as is used in the present invention.

The considerable beneficial effect of the heat exchange feature of the present invention can best be illustrated with reference to FIG. 4. In FIG. 4, one embodiment of the compact multi-stream, multi-passage plate-fin heat exchanger of the present invention for heat exchanging the various process streams of a reformation reaction is illustrated with regard to three process streams. It will be appreciated that the heat exchanger utilized for the various embodiments of the present invention may require additional process stream heat exchange beyond the three illustrated, and it is anticipated that six or more process streams may require heat exchange in the present invention, including oxidant gas, synthesis gas product, flue gas, hydrocarbon feed, water and/or steam, and fuel.

For purposes of illustration, the three stream heat exchange of FIG. 4 will be sufficient to illustrate the technique of plate-fin heat exchange for the reformation processes in the present invention. The compact plate-fin heat exchanger 400 of the present invention comprises a series of plates 410, 420, 430, as well as additional plates, which are interposed between various arrays of fins 426, 428 and 433, as well as additional arrays of fins, that exist between the various plates. The space between any two plates constitutes a passageway which has its heat exchange capability enhanced by the fins present in the passageway between two plates. The outer perimeter around the fin material and between the parallel plates is sealed off by a sealing bar 432. Fluid streams which are introduced into the core of the plate-fin heat exchanger are introduced through headers 416, 412 and 414 arranged on various outer parameters of the core. These headers are, in turn, fed by process streams in conduits 418, 422 and 424. The fluid streams pass through apertures 434, 436 and 438, respectively, communicating between the passageways between the multiple plates and the headers.

This is best illustrated with regard to header 412 being serviced by conduit 422. Fluid passing through this header enters the core of the plate-fin heat exchanger through a plurality of orifices such as 436. These orifices can have various fin stock, such as 442, which direct flow of the fluid down through a set of distributor fins 440 which distribute the fluid across the entire width of the particular passageway to find between two parallel plates. The fluid then passes down through additional fin stock 433 between several plates in parallel juxtaposed heat exchange with additional fins, such as 428, laminated between parallel plates 420 and 430. Alternatively, diffusion bonded or welded exchanger construction can be used rather than fin structures.

Figure 5:
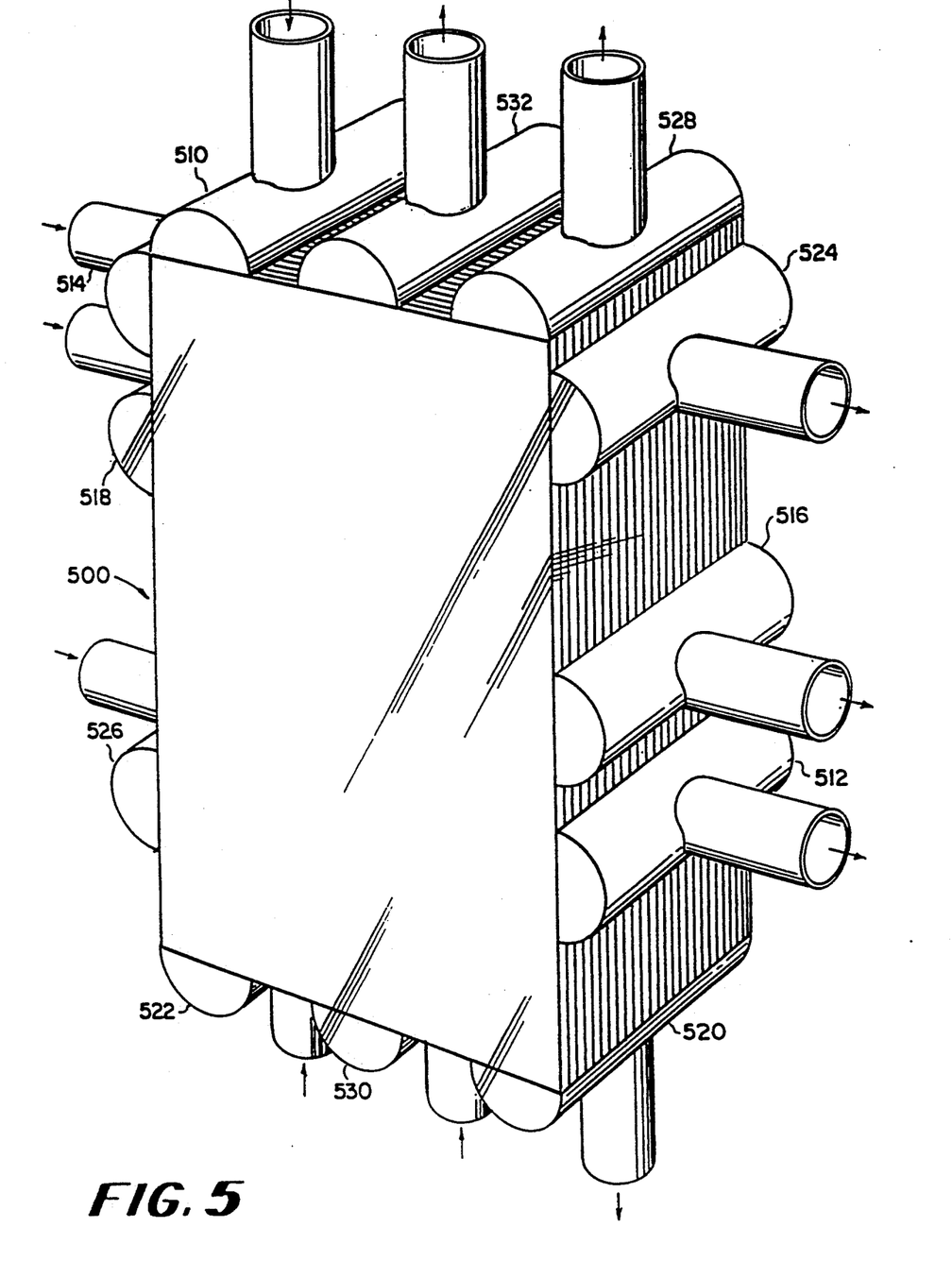
FIG. 5 is a perspective view of the compact plate-fin heat exchanger of FIG. 4 as is used in the present invention.

The partial plate-fin heat exchanger of FIG. 4 is shown in its entirety in FIG. 5. This FIG. 5 will illustrate the advantage of the compact nature of the present invention's heat exchange and will simplify and demonstrate the multi-stream concept of the reformation of the present invention. With reference to FIG. 5, the plate-fin heat exchanger is shown as 500. Various streams enter and leave the exchanger 500. The outside of the exchanger 500 has various headers 510–532 which connect process streams with the exchanger. Several of the streams use only a portion of the exchanger, such as water inlet header 514 which connects with water outlet header 516. Other streams, such as the flue gas using the headers 530 and 532, use the entire length of the exchanger. Each header will now be explained in order to illustrate the flows of the various streams through the exchanger. The hydrocarbon feed gas enters the inlet header 510 and exits the exchanger through outlet header 512. Water enters the exchanger through inlet header 514 and exits through outlet header 516. The hydrocarbon and water mixture enters through inlet header 518 and exits through outlet header 520. The synthesis gas product enters through inlet header 522 and exits through outlet header 524. The synthesis gas after being shifted is introduced through inlet header 526 and exits through outlet header 528. Finally, the flue gas enters through inlet header 530 and exits through outlet header 532.

For the reformation process, all of the multiple streams of the reformation process can be accommodated for efficient heat exchange in parallel juxtaposed heat exchange relationship in a single train compact heat exchange core using plate fin construction. Although deliberate and complete fin structure is shown in FIG. 4, it is contemplated that any form of flow enhancement and heat exchange enhancement of the surface area, such as enhanced surface treatment of plates or indentations or nodules in the passageways between plates, would constitute an adequate mechanism such as is contemplated by the plate-fin heat exchange nomenclature of the present invention.

The surprising improvement that can be achieved by the combination of a compact plate-fin heat exchanger having multi-stream, multi-passage capability in parallel juxtaposed heat exchange with any of an array of reformers, over the series discrete heat exchangers with an appropriate reformer of the prior art, results in the heat energy balance of the reformation process without having to resort to dedicated steam production equipment, and potentially without the export of steam that the prior art requires. The beneficial effect of the present invention is to reduce capital cost significantly, reduce the physical space requirements of the reformation process, and avoid the energy inefficiencies in those instances where export steam cannot be credited or taken advantage of in a reformation installation. These advantages can be viewed in context of reduced capital cost; or in the case of fixed capital cost, in significant efficiencies in the process operation, as will be set forth in the tables below which compare the various embodiments of the present invention against traditional prior art techniques.

In Table 1, below, the present invention is compared with a conventional reformation and heat exchange process, as is set forth in U.S. Pat. No. 4,071,330 using the typical heat exchange of FIG. 1 of the present specification, with regard to overall capital cost for a set hydrogen product production of 700 thousand standard cubic feet per day. It is readily apparent that the present invention is 10% less expensive than the conventional process for capital cost, resulting in an overall 5% product cost advantage. A 5% percent product cost advantage in the reforming industry is considered a significant advantage.

TABLE 1

| Plant size, MSCFD $H_2$ | 700 | 700 |
|---|---|---|
| Heat Recovery | Conventional | Compact |
| Relative Product Cost % | % | % |
| Capital | 39 | 36 |
| Utilities | 28 | 28 |
| Operating | 33 | 31 |
| TOTAL % | 100 | 95 |

With regard to Table 2, below, the same type of processes are compared, but this time the processes are constrained to a set capital cost of the present invention from Table 1 and the energy balances are compared. Under this comparison, the present invention exhibits a 3% efficiency over the conventional reformation process. Again, the reforming industry would deem a 3% operating efficiency to be significant.

TABLE 2

| Heat Recovery Energy Balance, BTU LHV | Conventional | Compact |
|---|---|---|
| $H_2$ Product | 100 | 100 |
| Natural Gas | 125 | 121 |
| Efficiency | 80 | 83 |

As a result, the present invention exhibits both a capital cost advantage and, for similar capital costs, an operating cost efficiency, which demonstrate the unexpected advantage of the present invention over the prior art.

The present invention has been set forth with regard to several preferred embodiments; however, the full scope of the invention should be ascertained from the claims which follow.

We claim:

1. A process for reforming a hydrocarbon stream into a synthesis gas product by heat exchanging the hydrocarbon stream against process streams at an elevated temperature in which heat exchange functions of the reforming process are effected in a plate-fin heat exchanger having multi-stream, multi-passage capability for parallel juxtaposed heat exchange of the various streams of the process, comprising:

a) introducing said hydrocarbon stream into said plate-fin heat exchanger and heating said hydrocarbon stream to an elevated temperature by juxtaposed parallel heat exchange against said process streams;

b) reforming said hydrocarbon stream at elevated temperature to produce a synthesis gas product; and c) cooling said synthesis gas product toward ambient temperature by passing said product through said plate-fin heat exchanger and heating said hydrocarbon stream and/or process streams by juxtaposed parallel heat exchange.

2. The process of claim 1 wherein steam is mixed with said hydrocarbon stream by separately heating said stream and water in said plate-fin heat exchanger in juxtaposed parallel heat exchange against process streams, removing said stream and water from said heat exchanger and directly contacting them in a separate saturator zone to saturate said stream with steam.

3. The process of claim 1 wherein steam is mixed with said hydrocarbon stream by direct injection of water into said stream and subsequent passage of the resulting stream and water mixture through said plate-fin heat exchanger to heat said mixture by juxtaposed parallel heat exchange against process streams to form a hydrocarbon and steam stream for reforming to a synthesis gas product.

4. The process of claim 1 wherein said hydrocarbon stream is initially heated in said plate-fin heat exchanger, is subsequently directly introduced into a desulfurization zone from said heat exchanger and is desulfurized before further heating in said heat exchanger prior to reformation into said synthesis gas product.

5. The process of claim 4 wherein water and/or steam is added to said hydrocarbon stream in a saturation zone or by direct injection subsequent to desulfurization and prior to reformation.

6. The process of claim 1 wherein the reforming of step b) is selected from the group consisting of steam-hydrocarbon reformation, partial oxidation, autothermal reformation, dry $CO_2$ reforming and combinations thereof.

7. The process of claim 1 wherein said synthesis gas product is introduced directly into a water gas shift reaction zone from said exchanger to convert carbon monoxide and water in the synthesis gas product to hydrogen and carbon dioxide and a product of said shift reaction zone is cooled by heating said hydrocarbon stream in said plate-fin heat exchanger by juxtaposed parallel heat exchange.

8. The process of claim 1 wherein said reforming is heated by the combustion of fuel and a resulting flue gas is cooled by heating at least said hydrocarbon stream in said plate-fin heat exchanger by juxtaposed parallel heat exchange.

9. A process for reforming a hydrocarbon stream and water into a synthesis gas product by heat exchanging said hydrocarbon stream and water against a synthesis gas product and a flue gas at an elevated temperature in a plate-fin heat exchanger having multiple parallel heat exchange passageways juxtaposed to one another through which said hydrocarbon stream, said water, said synthesis gas product and said flue gas separately pass during heat exchange one with another, comprising:

a) introducing said hydrocarbon stream into said plate-fin heat exchanger and heating said hydrocarbon stream to an elevated temperature by juxtaposed parallel heat exchange against said synthesis gas product and flue gas;

b) introducing said water into a plate-fin heat exchanger and heating said water to an elevated temperature by juxtaposed parallel heat exchange against said synthesis gas product and flue gas;

c) mixing said water with said hydrocarbon stream by contacting them in a separate saturator zone to saturate said stream with water;

d) further heating the resulting hydrocarbon and water stream of step c) in said plate-fin heat exchanger to an elevated temperature by juxtaposed parallel heat exchange against said synthesis gas product and flue gas;

e) reforming said hydrocarbon and water stream at elevated temperature to produce a synthesis gas product by heating said stream by the combustion of fuel to produce a flue gas; and f) cooling said synthesis gas product and said flue gas toward ambient temperature by passing said product and said gas separately through said plate-fin heat exchanger and heating said hydrocarbon stream and water to an elevated temperature by juxtaposed parallel heat exchange.

10. A process for catalytic reforming a hydrocarbon stream and water into a synthesis gas product by heat exchanging said hydrocarbon stream and water against a synthesis gas product and a flue gas at an elevated temperature in a plate-fin heat exchanger having multiple parallel heat exchange passageways juxtaposed to one another through which said hydrocarbon stream, said water, said synthesis gas product and said flue gas separately pass during heat exchange one with another, comprising:

a) introducing said hydrocarbon stream into said plate-fin heat exchanger and heating said hydrocarbon stream to an elevated temperature by juxtaposed parallel heat exchange against said synthesis gas product and flue gas;

b) separately introducing said water into said plate-fin heat exchanger and heating said water to an elevated temperature by juxtaposed parallel heat exchange against said synthesis gas product and flue gas;

c) directly introducing said hydrocarbon stream from said plate-fin heat exchanger into a desulfurization zone and desulfurizing said hydrocarbon stream;

d) mixing said water with said hydrocarbon stream by contacting them in a separate saturator zone to saturate said stream with water;

e) further heating the resulting hydrocarbon and water stream of step d) in said plate-fin heat exchanger to an elevated temperature by juxtaposed parallel heat exchange against said synthesis gas product and flue gas;

f) catalytically reforming said hydrocarbon and water stream at elevated temperature to produce a synthesis gas product by heating said stream by the combustion of fuel to produce a flue gas;

g) cooling said synthesis gas product and said flue gas toward ambient temperature by passing said product and said gas separately countercurrently to the flow of said hydrocarbon stream through said plate-fin heat exchanger and heating said hydrocarbon stream and water to an elevated temperature by juxtaposed parallel heat exchanger; and h) directly introducing said synthesis gas product from said plate-fin heat exchanger into a water gas shift reaction zone to convert carbon monoxide and water in said synthesis gas product to hydrogen and carbon dioxide and the resulting product of said shift reaction zone is cooled toward ambient temperature by heating said hydrocarbon stream and water to an elevated temperature in said plate-fin heat exchanger by juxtaposed parallel heat exchange.

11. The process of claim 10 wherein said reforming is a catalytic steam-methane reformation.

12. The process of claim 10 wherein said desulfurizing is conducted with a catalyst of zinc oxide.

13. The process of claim 10 wherein only the steam necessary for said reforming is produced in the process.

14. The process of claim 10 wherein said synthesis gas product is separated into a hydrogen stream and a waste stream in a pressure swing adsorption separation.

15. A process for reforming a hydrocarbon stream and water into a synthesis gas product by heat exchanging said hydrocarbon stream and water against a synthesis gas product and a flue gas at an elevated temperature in a plate-fin heat exchanger having multiple parallel heat exchange passageways juxtaposed to one another through which said hydrocarbon stream, said water, said synthesis gas product and said flue gas separately pass during heat exchange one with another, comprising:

a) directly injecting water into said hydrocarbon stream to form a resulting hydrocarbon stream and water mixture;

b) introducing said hydrocarbon stream and water into said plate-fin heat exchanger and heating said mixture to an elevated temperature by juxtaposed parallel heat exchange against said synthesis gas product and flue gas to form a hydrocarbon and steam stream;

c) reforming said hydrocarbon and steam stream at elevated temperature to produce a synthesis gas product by heating said stream by the combustion of fuel to produce a flue gas; and d) cooling said synthesis gas product and said flue gas toward ambient temperature by passing said product and said gas separately through said plate-fin heat exchanger while heating said hydrocarbon stream and water mixture to an elevated temperature by juxtaposed parallel heat exchange.

16. The process of claim 15 wherein the water and hydrocarbon streams are separately heated in said plate-fin heat exchanger prior to directly injecting the water into the hydrocarbon stream.

17. The process of claim 15 wherein the water and hydrocarbon streams are directly mixed in the plate-fin heat exchanger.

18. A process for reforming a hydrocarbon stream into a synthesis gas product by heat exchanging said hydrocarbon stream against a synthesis gas product at an elevated temperature in a plate-fin heat exchanger having multiple parallel heat exchange passageways juxtaposed to one another through which said hydrocarbon stream and said synthesis gas product separately pass during heat exchange one with another and by partial oxidation of said hydrocarbon stream, comprising:

a) introducing said hydrocarbon stream into said plate-fin heat exchanger and heating said hydrocarbon stream to an elevated temperature by juxtaposed parallel heat exchange against said synthesis gas product;

b) introducing an oxidant and optionally additional feed components into a plate-fin heat exchanger and heating said oxidant and optionally additional feed components to an elevated temperature by juxtaposed parallel heat exchange against said synthesis gas product;

c) mixing said oxidant and optionally additional feed components with said hydrocarbon stream;

d) reforming said hydrocarbon stream by at least partial oxidation of said hydrocarbon stream to produce a synthesis gas product; and e) cooling said synthesis gas product toward ambient temperature by passing said product separately through said plate-fin heat exchanger and heating said hydrocarbon stream, oxidant and optionally additional feed components to an elevated temperature by juxtaposed parallel heat exchange.

19. The process of claim 18 wherein the reformation of step d) is an autothermal reformation having an initial partial oxidation of said hydrocarbon stream followed by the catalytic reformation of any remaining hydrocarbon.

20. The process of claim 18 wherein the additional feed components are selected from the group consisting of water, stream, carbon dioxide and mixtures thereof.

21. The process of claim 18 wherein the oxidant is selected from the group consisting of air, oxygen enriched air and oxygen.

22. The process of claim 18 wherein said hydrocarbon stream is initially heated in said plate-fin heat exchanger, is subsequently directly introduced into a desulfurization zone from said heat exchanger and is desulfurized before further heating in said heat exchanger prior to reformation into said synthesis gas product.

23. The process of claim 18 wherein said synthesis gas product is introduced directly into a water gas shift reaction zone from said exchanger to convert carbon monoxide and water in the synthesis gas product to hydrogen and carbon dioxide and a product of said shift reaction zone is cooled by heating said hydrocarbon stream in said plate-fin heat exchanger by juxtaposed parallel heat exchange.

24. A process for reforming a hydrocarbon stream and water into a synthesis gas product with only the in situ formation of steam necessary for reforming by heat exchanging said hydrocarbon stream and water against a synthesis gas product and a flue gas at an elevated temperature in a plate-fin heat exchanger having multiple parallel heat exchange passageways juxtaposed to one another through which said hydrocarbon stream, said water, said synthesis gas product and said flue gas separately pass during heat exchange one with another, comprising:

a) introducing said hydrocarbon stream and said water into said plate-fin heat exchanger and heating them to an elevated temperature by juxtaposed parallel heat exchange against said synthesis gas product and flue gas, to form, in situ, only that steam necessary for reforming;

b) reforming said hydrocarbon and steam at elevated temperature to produce a synthesis gas product by heating said hydrocarbon and steam by the combustion of fuel to produce a flue gas; and c) cooling said synthesis gas product and said flue gas toward ambient temperature by passing said product and said gas separately through said plate-fin heat exchanger and heating said hydrocarbon stream and water to an elevated temperature by juxtaposed parallel heat exchange.

* * * * *